Figure 1:
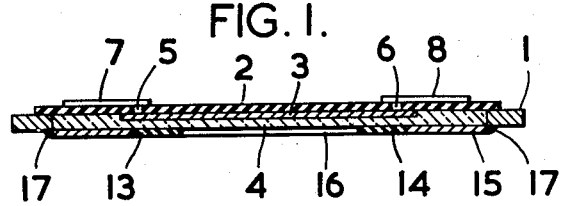

Feb. 4, 1964     D. H. COOPER     3,120,623

ELECTRICAL IMAGE INTENSIFYING DEVICES

Filed Oct. 26, 1960

INVENTOR
DAVID HARVEY COOPER
BY
Larson and Taylor

United States Patent Office 3,120,623
Patented Feb. 4, 1964

3,120,623
ELECTRICAL IMAGE INTENSIFYING DEVICES
David Harvey Cooper, Harlow, England, assignor to Associated Electrical Industries Limited, London, England, a British company
Filed Oct. 26, 1960, Ser. No. 65,113
Claims priority, application Great Britain Oct. 29, 1959
3 Claims. (Cl. 313—65)

The present invention relates to electrical image intensifying devices and more particularly to intensifying plates for use in such devices, and to methods of manufacturing said plates. The image to be intensified may be carried in a beam of visible light, a beam of X-rays or a beam of electrons, for example.

Electrical image intensifying devices are known which comprise an intensifying plate including a sensitive layer of a material, the electrical conductivity of which can be varied by irradiation with a beam of exciting radiation. If such a beam carries an image, so that the intensity of the beam varies across its cross section, the conductivity of each elemental portion of the sensitive layer will be varied in accordance with the intensity of the radiation thereon.

In such an image intensifying device a first surface of the sensitive layer of the intensifying plate is conveniently covered with a thin layer of electrically conducting material which is connected to a suitable source of D.C. potential. The second surface of the sensitive layer is scanned with a beam of low energy electrons in accordance with a raster. If the free surface of said electrically conducting layer is irradiated with the image carrying beam of exciting radiation, the beam will penetrate through the conducting layer and will vary the conductivity of each elemental portion of the sensitive layer, as already described. When the second surface of the sensitive layer is scanned with the low energy electron beam a current will flow through the sensitive layer and the instantaneous value of this current will be dependent upon the conductivity of the elemental portion of the sensitive layer being scanned. This current can be amplified and used to modulate the intensity of the beam in a cathode ray display tube and hence provide an intensified image of the original image in the beam of radiation. The current is conveniently allowed to flow along a conductor from the electrically conducting layer.

The sensitive layer is conveniently supported on a thin plastic electrically insulating membrane. The layer of electrically conducting material, which forms a signal plate, is located between the sensitive layer of the membrane and the connection to the signal plate is conveniently led out between the sensitive layer and the membrane. There is a danger of the material of the sensitive layer breaking down between the connection to the signal plate and the scanned surface of the sensitive layer, and this will result in spurious signals being received from the signal plate.

The object of the present invention is to provide an improved type of intensifying plate for use in an electrical image intensifying device of the type described.

According to the present invention an intensifying plate for use in an electrical image intensifying device of the type herein described comprises a thin supporting membrane of electrically insulating material, a thin plate of electrically conducting material extending over part of the first surface of said membrane, a conductor from said conducting plate extending through a hole in said membrane to a terminal located on the second surface of said membrane, and a sensitive layer of a material of the type described deposited over said conducting plate and over the uncovered portion of the first surface of said membrane.

Preferably a layer of electrically conducting material is located on the free surface of said sensitive layer and is formed with an aperture of such a size that the edges of said aperture are located outside the peripheral edges of said conducting layer.

The material of the sensitive layer may be either photo-conducting or cathodo-conducting. A photo-conducting material has the property that its conductivity varies in accordance with the intensity of an irradiating beam of exciting radiation, and a cathodo-conducting material has the property that its conductivity varies in accordance with the intensity of a beam of bombarding electrons. Cathodo-conductivity is alternatively known as bombardment induced conductivity.

One photo-conducting material suitable for use in the intensifying plate is amorphous selenium.

The membrane may be made of a plastic material such as the polyester fibre material known by the name Melinex (registered trademark).

The free surface of the supporting membrane is adapted to be irradiated with the image carrying beam of radiation, and the free surface of the sensitive layer is adapted to be scanned with the beam of low energy electrons, in accordance with the principle of operation of the image intensifying device.

By locating the conductor from the electrically conducting plate and its associated terminal on the side of the supporting membrane which is remote from the electrically conducting layer and the scanning beam of electrons, any defects due to the breaking down of the sensitive layer are avoided.

Figure 2:
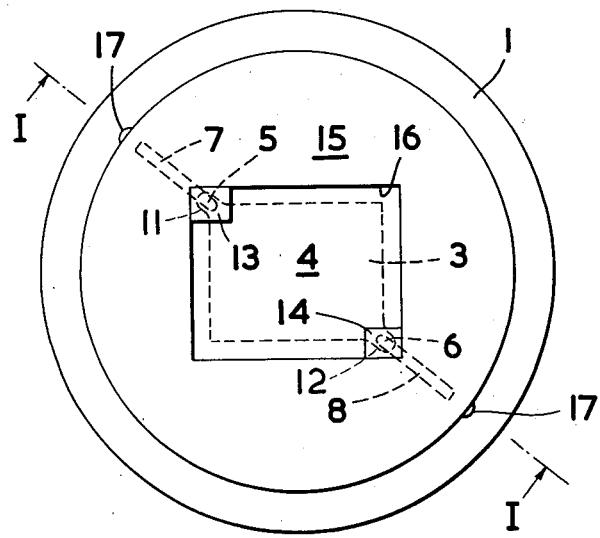

In order that the invention may be more readily understood reference will now be made to the accompanying drawing in which:

FIGURE 1 is a side view sectioned on a plane through the centre of one embodiment of the invention, and FIGURE 2 is a plan view of the intensifying plate illustrated in FIGURE 1.

With reference to FIGURES 1 and 2, one form of image intensifying plate constructed in accordance with the invention comprises a metal support ring 1 over which is stretched a thin electrically insulating membrane 2 of a suitable material, such as the plastic polyester material known as Melinex. Each surface of the membrane is extremely flat since the membrane is very tightly stretched. On one surface of the membrane 2 is formed a thin plate 3 of electrically conducting material. Suitable materials for the plate 3 are aluminum and bismuth, for example. The plate 3 is very thin so as to be transparent to the image carrying beam of radiation. The plate does not extend as far as the inner edge of the support ring 1 and is substantially rectangular in shape.

Over the free surface of the plate 3 and the uncovered portion of the surface of the membrane 2 is deposited a sensitive layer 4 of a material which is either photo-conducting or cathodo-conducting, as defined above. Such a material may be amorphous selenium, for example. The sensitive layer 4 extends as far as the ring 1 and has a thickness sufficiently great to ensure that its free surface is very smooth. The thickness of the sensitive layer is very even.

Two small holes 5, 6 are formed in the membrane 2 adjacent to two opposite corners of the plate 3, and these are filled with a conducting material such as silver paint or a colloidal silver such as that known by the name Degussa Silver (registered trademark), for example. The conducting material in these two holes forms conducting paths from the conducting plate 3 to two terminals 7, 8 which extend over the free surface of the membrane 2 towards the ring 1. These terminals 7, 8 are adapted to be connected to a suitable source of potential and the plate 3 forms the signal plate of the intensifying plate.

The relative positions of the various components can be seen from FIGURE 2. It is preferable to have two holes 5, 6 extending through the membrane 2 from the plate 3 in case the conductor in either of these holes is destroyed. The plate 3 may be extended at the two corners at which are located the two holes 5, 6 so as to form two ears 11, 12 from which the conductors extend. It is also preferable to secure small pieces of insulating material 13, 14 on the free surface of a sensitive layer 4 over the positions of the holes 5, 6 because these holes are inclined to form nuclei for crystalisation in the amorphous selenium of the layer 4. Such nuclei would give rise to corresponding points of high potential during the scanning of the free surface of the layer 4.

A layer 15 of electrically conducting material such as aluminium, is located on the free surface of the sensitive layer 4 and is formed with a central aperture 16. The aperture 16 is of such a size and is so located that the edges thereof are located outside the extent of the conducting plate 3, as indicated more clearly in FIGURE 2. Hence the whole of the plate 3 is located within the aperture 16 but is covered with the layer 4 of sensitive material. The layer 15 is electrically connected at 17 to the support ring 1 and is thereby adapted to be connected to a suitable potential.

The intensifying plate described above may be used in an image intensifying device of the type described. The free surface of the membrane 2 is arranged to be irradiated with an image carrying beam of the radiation which excites the sensitive layer 4, or bombarded with an image carrying beam of high energy electrons which excites the sensitive layer 4. This beam permeates through the membrane 2 and the conducting plate 3 so as to excite the sensitive layer 4. Hence the conductivity of each elemental portion of the layer 4 is varied in accordance with the intensity of the beam falling thereon.

The free surface of the sensitive layer 4 is scanned in accordance with a raster with a beam of low energy electrons and when the conducting plate 3 is connected via the terminals 7, 8 to a suitable potential, a varying current will flow across the sensitive layer 4 to the plate 3 and can be arranged to produce signals. These signals will have instantaneous values corresponding to the intensity of the radiation on the elemental portion of the sensitive layer 4 being scanned. These signals can be supplied to a suitable display apparatus to produce an intensified image by well known methods.

The conducting layer 15 is connected to a suitable potential and prevents the image from being deformed by the effects of stray electrons and stray charges at the edge of the scanned area. Since the terminals 7, 8 are located on the surface of the membrane 2 remote from the sensitive layer 4, the high potential applied to these terminals is well insulated from the scanning electron beam and also from the layer 15, even if a partial break down in the insulation of the sensitive layer 4 occurs. This prevents the production of any spurious signals arising from the collection of any scanning electrons by the terminals 7, 8 and prevents the distortion of the scanning raster by the electrostatic influence of the terminals 7, 8.

What I claim is:

1. An intensifying plate for use in an electrical image intensifying device of the type herein described, comprising a thin supporting membrane of electrically insulating material, a first surface and a second surface of said membrane, a thin plate of electrically conducting material extending over part of said first surface of said membrane, a terminal located on the second surface of said membrane, a hole in said membrane, a conductor extending through said hole from said conducting plate to said terminal, and a sensitive layer of a material sensitive to the beam of radiation containing the image to be intensified deposited over said conducting plate and over the uncovered portion of the first surface of said membrane.

2. An intensifying plate for use in an electrical image intensifying device of the type herein described comprising a thin supporting membrane of electrically insulating material, a first surface and a second surface of said membrane, a thin plate of electrically conducting material extending over part of said first surface of said membrane, a terminal located on the second surface of said membrane, a hole in said membrane, a conductor extending through said hole from said conducting plate to said terminal, a sensitive layer of a material sensitive to the beam of radiation containing the image to be intensified deposited over said conducting plate and over the uncovered portion of the first surface of said membrane, a free surface to said sensitive layer, a layer of electrically conducting material located on said free surface of said sensitive layer, and edges to said conducting layer defining an aperture in said layer, said edges being located outside the peripheral edges of said conducting plate.

3. An intensifying plate for use in an electrical image intensifying device of the type herein described comprising a thin supporting membrane of electrically insulating material, a first surface and a second surface of said membrane, a thin substantially rectangular plate of electrically conducting material extending over part of said first surface of said membrane, a strip of electrically conducting material extending from the edge of said conducting plate over said first surface of said membrane, a hole in said membrane located adjacent to the end of said strip remote from said plate, a terminal located on the second surface of said membrane, a conductor extending through said hole from said strip to said terminal, and a sensitive layer of a material sensitive to the beam of radiation containing the image to be intensified deposited over said conducting plate and over the uncovered portion of the first surface of said membrane.

No references cited.